US012347935B1

(12) United States Patent
Volakis et al.

(10) Patent No.: US 12,347,935 B1
(45) Date of Patent: Jul. 1, 2025

(54) DUAL-BAND ANTENNA ARRAY WITH STACKED ROTMAN LENS FEED FOR BEAMFORMING

(71) Applicants: John L. Volakis, Miami, FL (US); Muhammad Mubasshir Hossain, Miami, FL (US); Satheesh Bojja Venkatakrishnan, Miami, FL (US); Stavros Koulouridis, Miami, FL (US)

(72) Inventors: John L. Volakis, Miami, FL (US); Muhammad Mubasshir Hossain, Miami, FL (US); Satheesh Bojja Venkatakrishnan, Miami, FL (US); Stavros Koulouridis, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/059,957

(22) Filed: Feb. 21, 2025

(51) Int. Cl.

| | |
|---|---|
| ***H01Q 25/00*** | (2006.01) |
| ***H01Q 1/28*** | (2006.01) |
| ***H01Q 1/48*** | (2006.01) |
| ***H01Q 5/20*** | (2015.01) |
| ***H01Q 5/30*** | (2015.01) |

(52) U.S. Cl.
CPC ............. *H01Q 25/008* (2013.01); *H01Q 1/28* (2013.01); *H01Q 1/48* (2013.01); *H01Q 5/20* (2015.01); *H01Q 5/30* (2015.01)

(58) Field of Classification Search
CPC .......... H01Q 25/008; H01Q 5/20; H01Q 5/30; H01Q 1/28; H01Q 1/48
USPC .......................................................... 342/368
See application file for complete search history.

(56) References Cited

U.S. PATENT DOCUMENTS

2012/0146842 A1* 6/2012 Kang ....................... H01Q 3/44
342/175
2020/0403310 A1* 12/2020 Merola ................ H01Q 25/008
2021/0376486 A1* 12/2021 Williams ............. H01Q 1/3233

FOREIGN PATENT DOCUMENTS

CA 2790083 A1 * 9/2011 ........... G01S 13/345
CN 119556481 A * 3/2025
WO WO-2010087453 A1 * 8/2010 ............... H01Q 1/32

* cited by examiner

*Primary Examiner* — Harry K Liu
(74) *Attorney, Agent, or Firm* — SALIWANCHIK, LLOYD & EISENSCHENK

(57) ABSTRACT

Systems and methods are provided for simultaneous beamforming at two close frequency bands. Rotman-lens-based beamforming modules with low size, weight, and power (SWaP) can be used. A stacked array Rotman lens module can use a low cost feeding type of layer-to-layer energy transitions, and the stacked module can be capable of simultaneous beamforming at two close frequency bands.

20 Claims, 18 Drawing Sheets

| Code | Layer |
|---|---|
| C1 | Copper Layer 1(Ground) |
| S1 | Substrate Layer 1 (Rogers RO3006 0.64mm thick) |
| C2 | Copper Layer 2 (Printed Rotman Lens) |
| S2 | Substrate Layer 2 (Rogers RO3006 0.64mm thick) |
| C3 | Copper Layer 3 (Ground) |
| S3 | Substrate Layer 3 (Rogers RO3006 0.64mm thick) |
| C4 | Copper Layer 4 (Printed Rotman Lens) |
| S4 | Substrate Layer 4 (Rogers RO3006 0.64mm thick) |
| C5 | Copper Layer 5 (Ground) |
| S5 | Substrate Layer 5 (Rogers RO4003 0.508mm thick) |
| C6 | Copper Layer 6 (Patch Antenna) |

DUAL-BAND ANTENNA ARRAY WITH STACKED ROTMAN LENS FEED FOR BEAMFORMING

BACKGROUND

Remote sensing CubeSats and unmanned aerial vehicles (UAVs) require spectrally efficient and secure wireless communication links in an infrastructure-less ad hoc mobile network. Multiple satellite-based internet providers are using Ku-band (12 gigahertz (GHz)-18 GHz) for their 5G/6G transmitting and receiving communications. However, propagation loss is high at this band, particularly for non-line-of-sight (NLOS) communications.

BRIEF SUMMARY

Embodiments of the subject invention provide novel and advantageous systems and methods for simultaneous beamforming at two close frequency bands. Rotman-lens-based beamforming modules with low size, weight, and power (SWaP) can be used. A stacked array Rotman lens module can use a low cost feeding type of layer-to-layer energy transitions, and the stacked module can be capable of (or configured to provide) simultaneous beamforming at two close frequency bands. The module may use, for example, only three vertical grounding metallized vias for coaxial-to-stripline transitions. A transition method of similar type (i.e., metallized vias) can also be used for stripline-to-microstrip transitions.

In an embodiment, a device/module/system for simultaneous beamforming at two different frequency bands can comprise: a first Rotman lens; a second Rotman lens disposed on the first Rotman lens; and a top microstrip layer disposed on the second Rotman lens and comprising a first microstrip antenna patch array on a first area of the top microstrip layer and a second microstrip antenna patch array on a second area of the top microstrip layer different from the first area. The first microstrip antenna patch array being configured to operate at a first frequency, and the second microstrip antenna patch array being configured to operate at a second frequency higher than the first frequency, with the second frequency being, for example, no more than 20% higher than the first frequency (e.g., no more than 15% higher than the first frequency. The first Rotman lens can comprise a first filter connected to at least one input port of the first Rotman lens, and the second Rotman lens comprising a second filter connected to at least one input port of the second Rotman lens. The first Rotman lens can comprise a plurality of the first filters respectively connected to each input port of the first Rotman lens, and the second Rotman lens can comprise a plurality of the second filters respectively connected to each input port of the second Rotman lens. The (or each) first filter can be a low-pass filter and can be connected to the patch arrays (e.g., the first microstrip antenna patch array) operating in the lower frequency band (e.g., at the first frequency); and the (or each) second filter can be a high-pass filter and can be connected to the patch arrays (e.g., the second microstrip antenna patch array) operating in the higher frequency band (e.g., at the second frequency). The first Rotman lens can comprise, for example, at least five input ports, and the second Rotman lens can comprise, for example, at least five input ports. The device can further comprise: a first ground plane disposed in between the first Rotman lens and the second Rotman lens, configured to function as a common ground plane (and/or functioning as a common ground plane) for both the first Rotman lens and the second Rotman lens; a first substrate on which the first Rotman lens is disposed; a second substrate disposed on the first Rotman lens; a third substrate on which the second Rotman lens is disposed; and/or a fourth substrate disposed on the second Rotman lens. Each of the first substrate, the second substrate, the third substrate, and the fourth substrate can be electrically insulating. The second Rotman lens can be connected to the top microstrip patch array (i.e., to the first microstrip antenna patch array and/or the second microstrip antenna patch array) operating in the higher frequency band. As the stand-alone Rotman lens is wideband (e.g., the first Rotman lens and/or the second Rotman lens can be wideband), an identical Rotman lens can be configured to operate in both frequency bands (e.g., either of the first and second Rotman lenses can be configured to operate at the first frequency, and the same for the second frequency). Any or all of the first Rotman lens, the second Rotman lens, the first microstrip antenna patch array, and the second microstrip antenna patch array can comprise metal (e.g., copper, aluminum, gold, silver, platinum), and any or all of these elements can comprise the same metal as any or all of the other elements. In a specific embodiment, the first frequency can be 15.3 gigahertz (GHz) (or about 15.3 GHZ), and/or the second frequency can be 17.2 GHz (or about 17.2 GHz), though embodiments are not limited thereto.

In a further embodiment, the device can comprise a layered structure comprising: a first ground plane; a first substrate disposed on the first ground plane; the first Rotman lens disposed on the first substrate; a second substrate disposed on the first Rotman lens; a second ground plane disposed on the second substrate; a third substrate disposed on the second ground plane; the second Rotman lens disposed on the third substrate; a fourth substrate disposed on the second Rotman lens; a third ground plane disposed on the fourth substrate; a fifth substrate disposed on the third ground plane; and the top microstrip layer disposed on the fifth substrate. Each of the first substrate, the second substrate, the third substrate, the fourth substrate, and the fifth substrate can be electrically insulating. The device can further comprise: a first metallized via connected to the top microstrip layer and the second Rotman lens; a second metallized via connected to the third ground plane and the first ground plane; and/or a third metallized via connected to the second ground plane and the first ground plane. The layered structure can be free of air gaps, such that no air gaps are present between the first ground plane and the top microstrip layer (over the entire area of the device).

DETAILED DESCRIPTION

Figure 1:
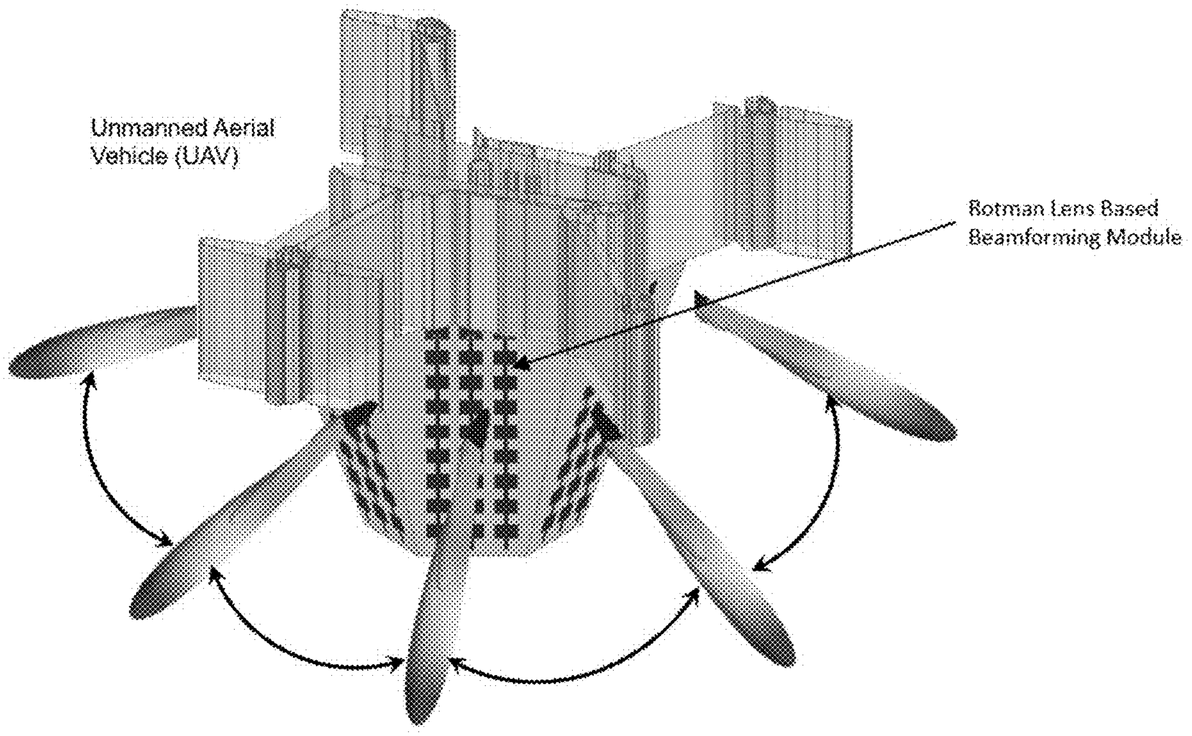
FIG. 1 shows a Rotman-lens-based beamforming module, according to an embodiment of the subject invention. The module is shown on an unmanned aerial vehicle (UAV) and shows 360° one-dimensional (1-D) beam switching using faces frustum.

Embodiments of the subject invention provide novel and advantageous systems and methods for simultaneous beamforming at two close frequency bands (e.g., higher frequency band is within 20% of the lower frequency band). Rotman-lens-based beamforming modules with low size, weight, and power (SWaP) can be used. A stacked array Rotman lens module can use a low cost feeding type of layer-to-layer energy transitions, and the stacked module can be capable of (or configured to provide) simultaneous beamforming at two close frequency bands. The module may use, for example, only three vertical grounding metallized vias for coaxial-to-stripline transitions. A transition method of similar type (i.e., metallized vias) can also be used for stripline-to-microstrip transitions.

While a beamforming array delivers high gain, compensating for propagation losses, a high frequency beamforming array module that can be fed by digital phase shifters can be costly. For miniaturized satellites or aerospace systems, using low-cost, lightweight, and compact means is a key issue. Embodiments of the subject invention provide low size, weight and power (SWaP) stacked array Rotman lens modules, which can utilize a novel low-cost feeding type of layer-to-layer energy transition. The stacked module can be capable of (or configured to provide) simultaneous beamforming at two close frequency bands. The module can use only three vertical grounding metalized vias for coaxial-to-stripline transitions. Also, the module can apply a transition method of similar type (i.e., metallized vias) for stripline-to-microstrip transitions. The module can advantageously support system-in-package (SiP) technology, which is favorable for all miniaturized space systems and automobile radars. Also, the module can reduce the planar area required, compared to single layer structures.

Stacked dual-band analog beamformers are usually bulky because the major volume carriers for beamforming are the airgaps between each passive network. These airgaps can be three to five times the free-space wavelength at operating frequency. However, CubeSats and unmanned aerial vehicles (UAVs) cannot fit structures of such volume. In order to address that, embodiments of the subject invention provide a thin packaging solution for a module, such as a module with two stripline Rotman lenses and two microstrip patch arrays. The motivation to design a dual-band beamforming array module was a result of extensive research over multiple years on low-profile, low-cost simultaneous transmit-receive beamforming means, which resulted in the realization of the importance of developing a technology to beamform at two close frequency bands. While high-gain dual-band beamforming is still an underdeveloped area of research, embodiments of the subject invention require complex design procedures while enabling simultaneous transmit-receive beamforming from a thin and lightweight module. This provides advantages over related art devices, which use expensive digital phase shifters for each antenna array input, making the whole module costly. Also, related art analog passive beamformers use air gaps between two beamformers, which makes the entire module bulky.

Figure 2:
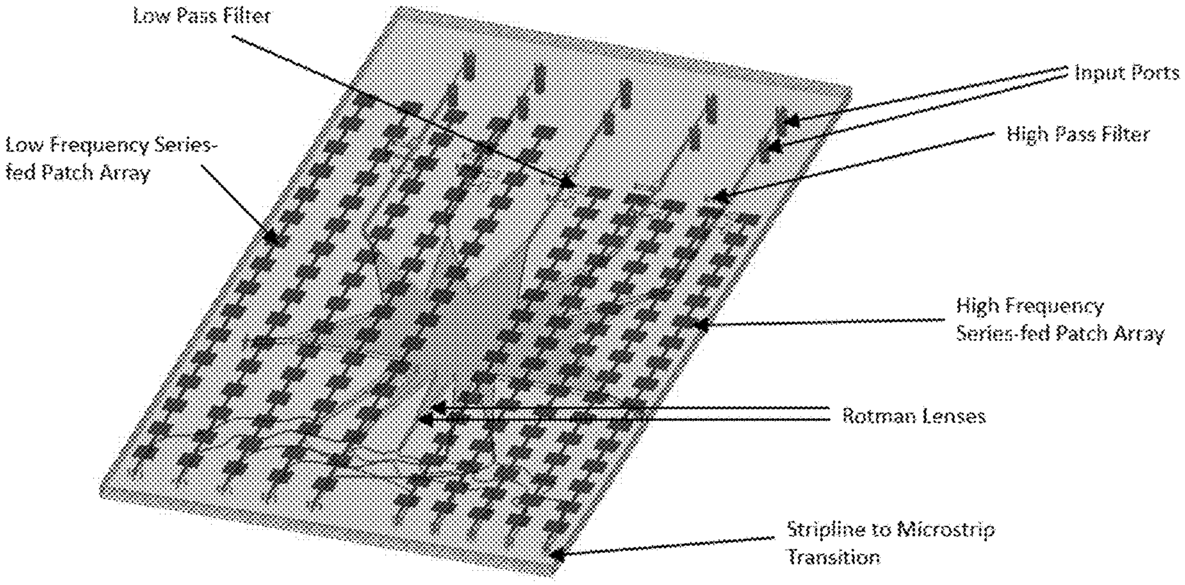
FIG. 2 shows a three-dimensional (3D) view of a Rotman-lens-based beamforming module, according to an embodiment of the subject invention.
Figure 3:
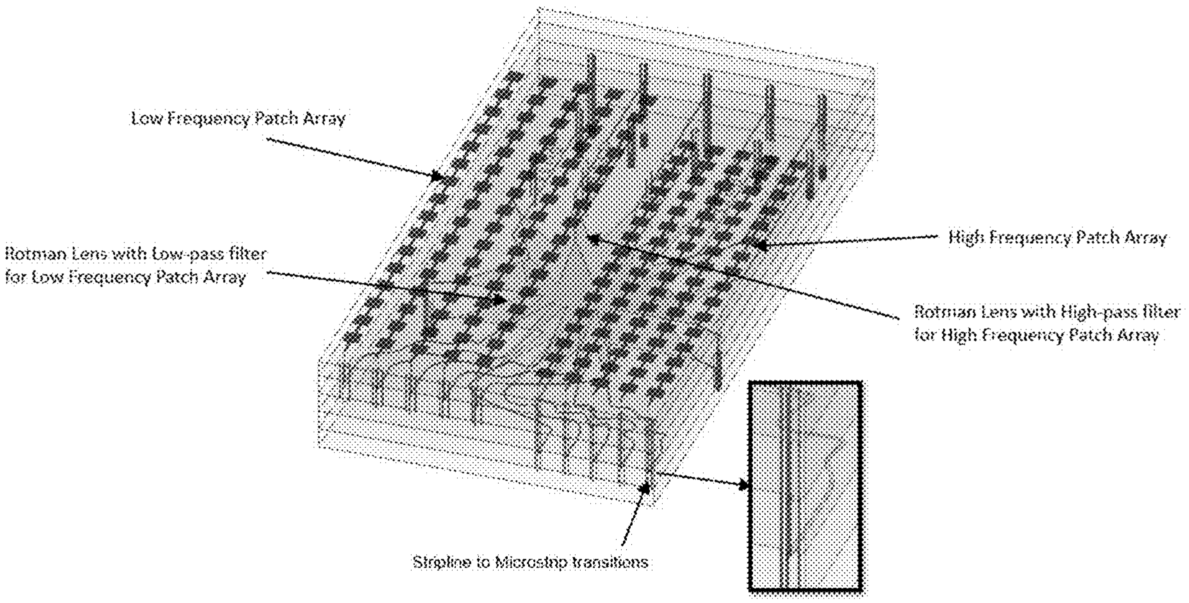
FIG. 3 shows a vertically expanded 3D view of the dual-band Rotman-lens-based beamforming module from FIG. 2.

FIG. 1 shows an example of using a dual-band beamforming array, according to an embodiment of the subject invention, on five faces of a UAV to get complete 360° one-dimensional (1D) beam scanning. The module could also be integrated into CubeSats, allowing them to simultaneously communicate with multiple ground stations. FIG. 2 shows a three-dimensional (3D) view of a compact Rotman lens array module, according to an embodiment of the subject invention., and FIG. 3 shows the size reduction technique with a vertically expanded view of the dual-band beamforming module.

Figure 4:
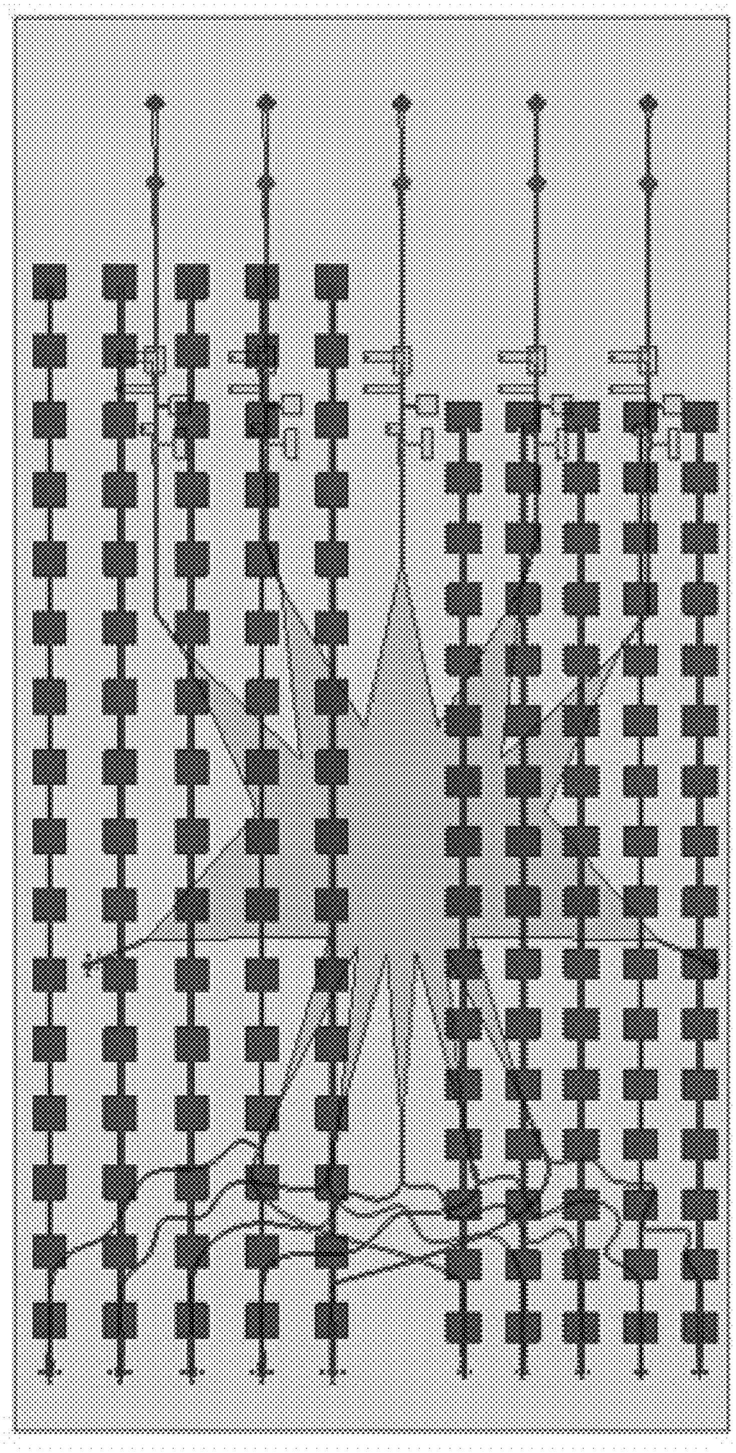
FIG. 4 shows a two-dimensional (2D) view of the Rotman-lens-based beamforming module from FIGS. 2 and 3.
Figure 5:
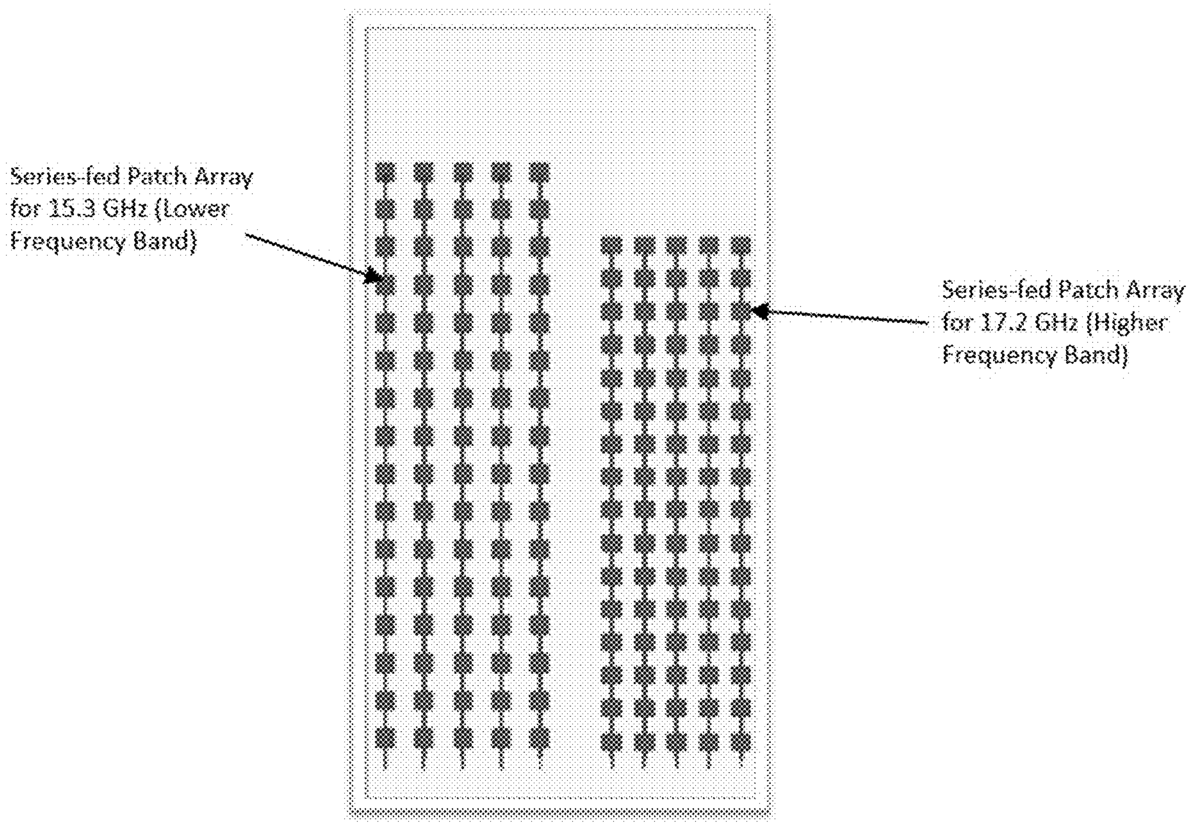
FIG. 5 shows two 5×16 patch arrays (15.3 gigahertz (GHz) and 17.2 GHZ, respectively) that can be used in a Rotman-lens-based beamforming module, according to an embodiment of the subject invention.

FIG. 4 depicts a transparent top view of a module, according to an embodiment of the subject invention, and FIG. 5 shows two 5×16 series-fed patch arrays at different frequencies (e.g., 15.3 gigahertz (GHz) (lower frequency) and 17.2 GHz (higher frequency)). These two microstrip patch arrays for higher and lower frequencies can be placed on the topmost microstrip layer. The lower frequency array can be placed on one side (e.g., left side), and the higher frequency array can be placed on the other side (e.g., right side).

Figure 6:
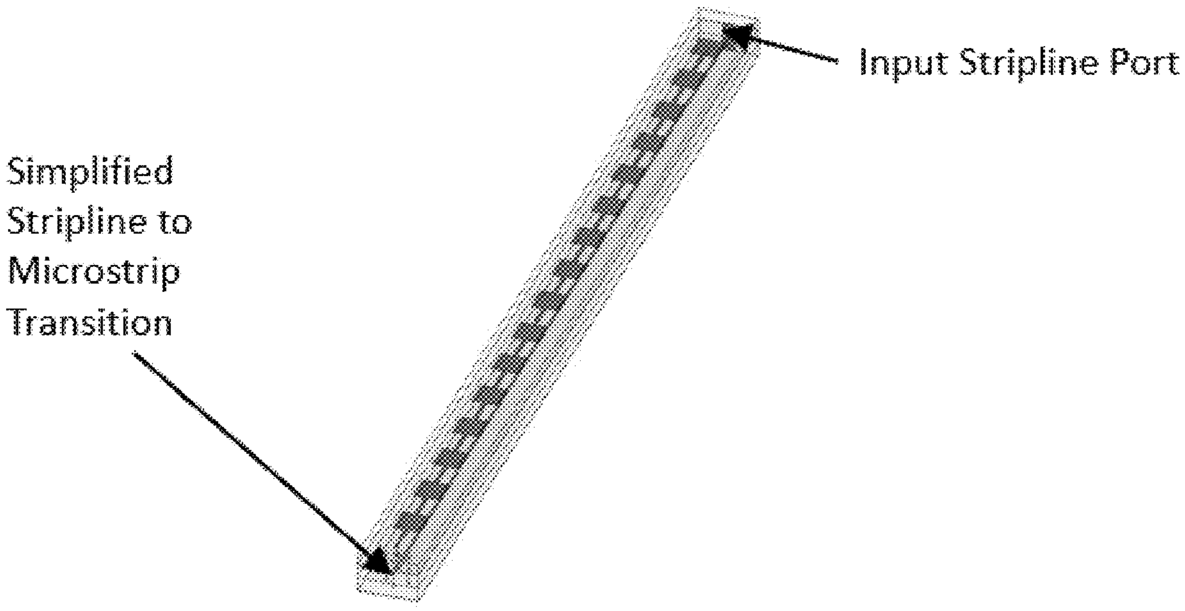
FIG. 6 shows a 1×16 series-fed patch array (15.3 GHZ) using a simplified vertical stripline to microstrip transition.
Figure 7:
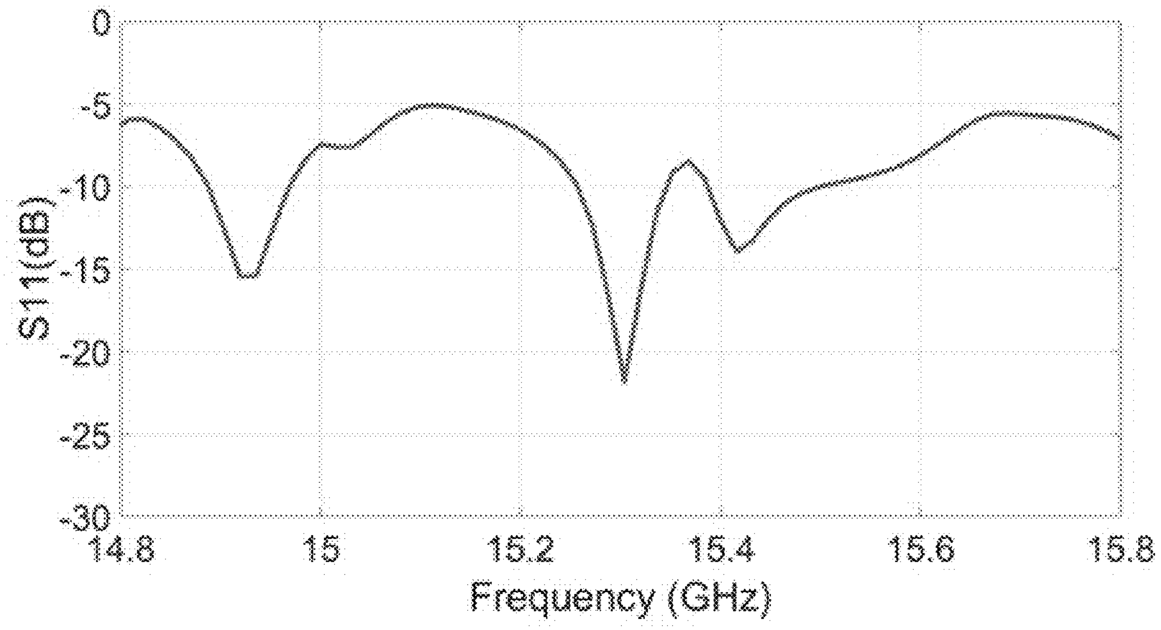
FIG. 7 shows a plot of $S_{11}$ (in decibels (dB)) versus frequency (in GHz) for the array shown in FIG. 6.
Figure 8:
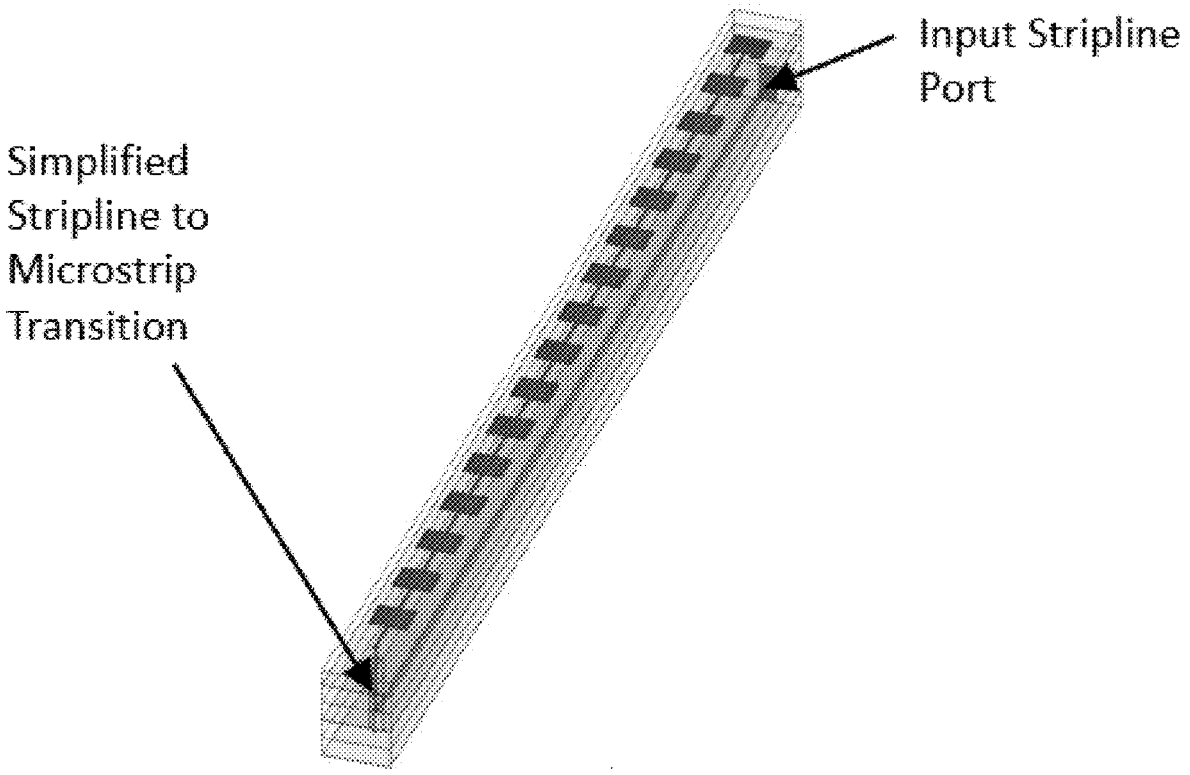
FIG. 8 shows a 1×16 series-fed patch array (17.2 GHz) using a simplified vertical stripline to microstrip transition.
Figure 9:
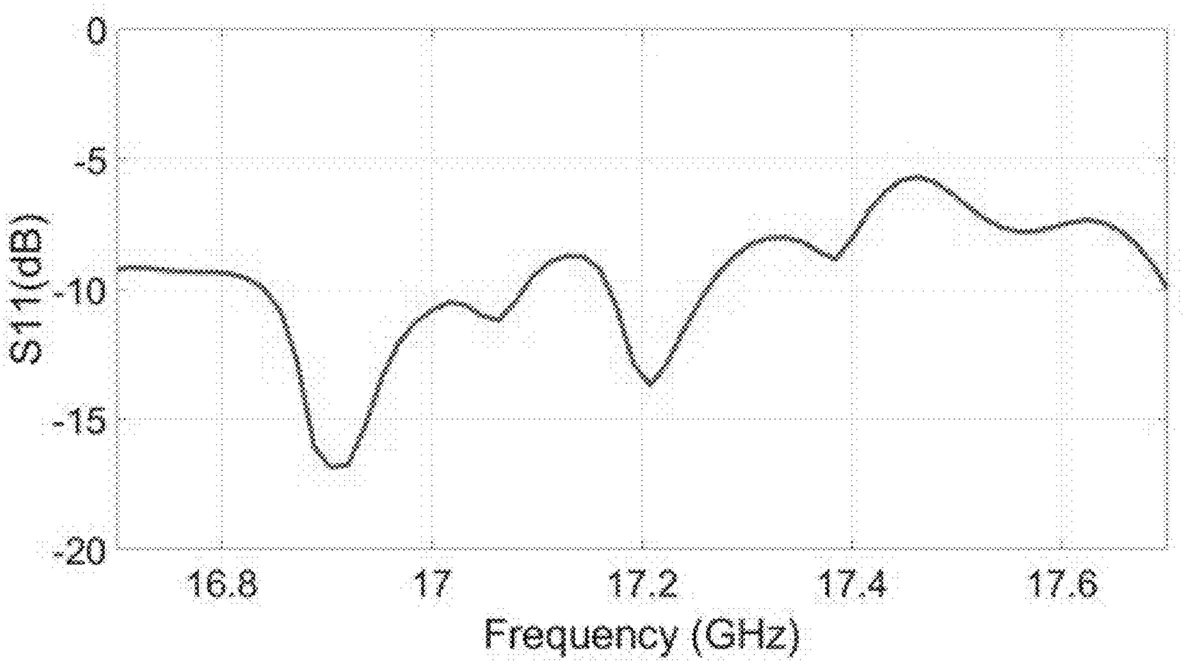
FIG. 9 shows a plot of $S_{11}$ (in dB) versus frequency (in GHz) for the array shown in FIG. 8.

FIGS. 6 and 8 show individual **1*x*16 series-fed patch arrays for 15.3 GHZ operation and 17.2 GHz operation, respectively. These figures illustrate that the patch arrays can be designed with vertical stripline-to-microstrip transitions fed by stripline transmission lines on the bottom layers. FIGS. 7 and 9 show the input port matching for the arrays in FIGS. 6 and 8**, respectively.

Modules of embodiments of the subject invention employ a novel design by stacking two identical wideband stripline Rotman lenses in the two bottom-most layers. Each parallel plate stripline Rotman lens can have ground planes on the top side and on the bottom side, while the printed metal Rotman lens can be suspended in between two substrates (e.g., electrically insulating substrates). As they are in stacked form, they can share a common ground plane. The two substrates can have thicknesses that are the same as (or about the same as) each other. Each substrate can be a composite substrate, such as ceramic-filled polymer (e.g., polytetrafluoroethylene (PTFE)) composite substrates. The substrates can be, for example, Rogers RO3006 laminates (which are ceramic-filled PTFE composites).

Figure 10:
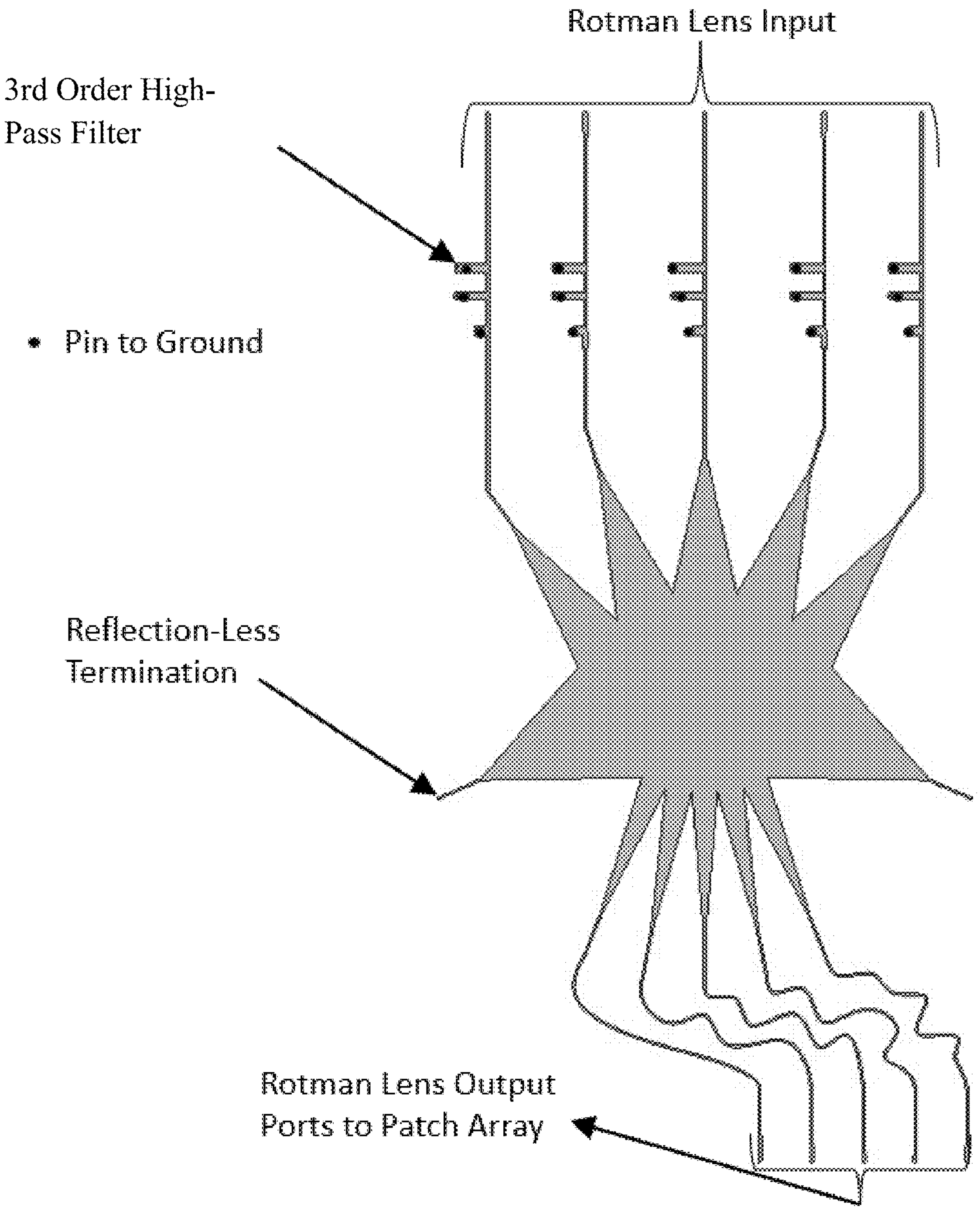
FIG. 10 shows a Rotman lens with a high-pass filter for 17.2 GHz array feeding.
Figure 11:
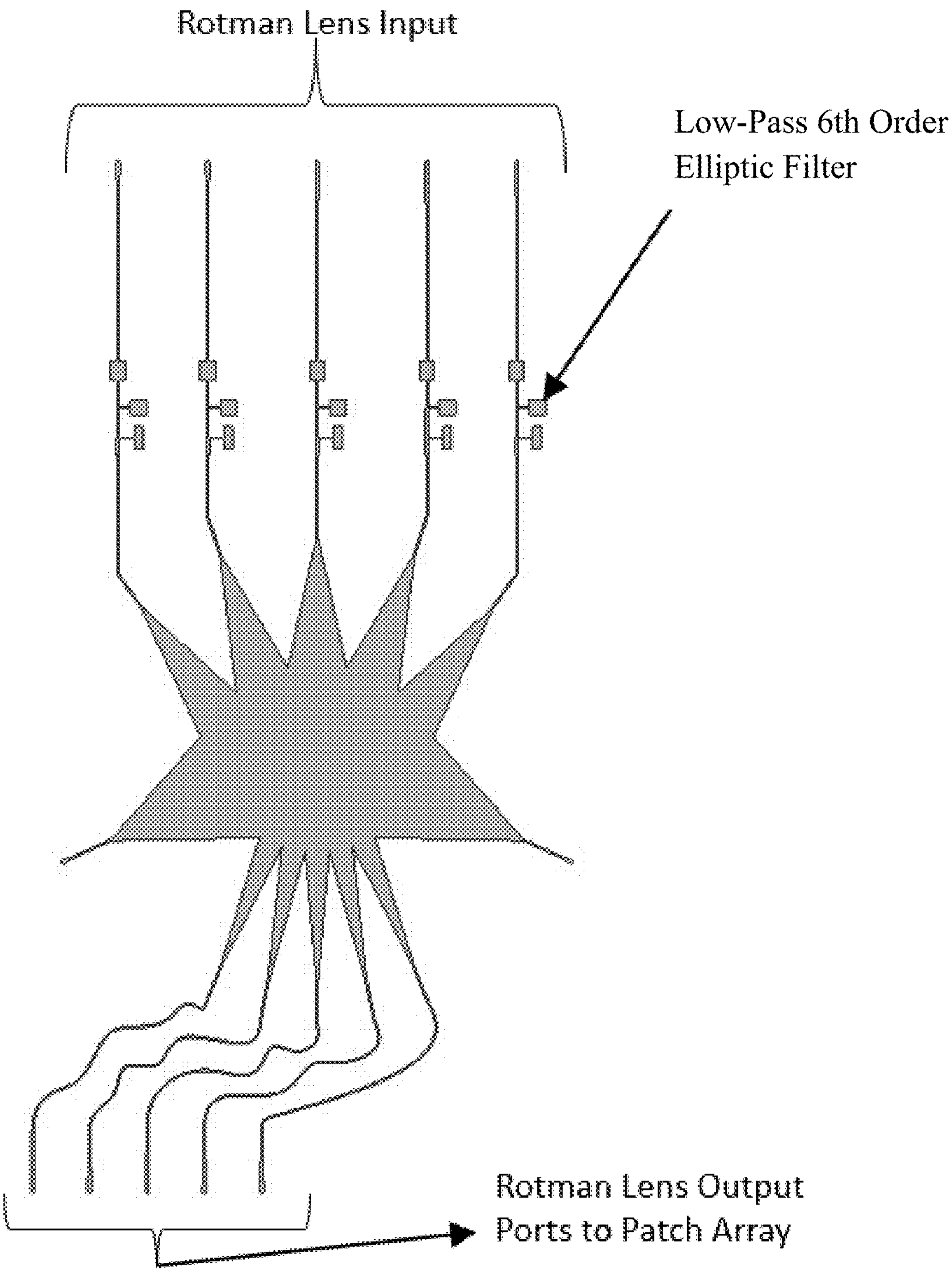
FIG. 11 shows a Rotman lens with a low-pass filter for 15.3 GHZ array feeding.
Figure 12:
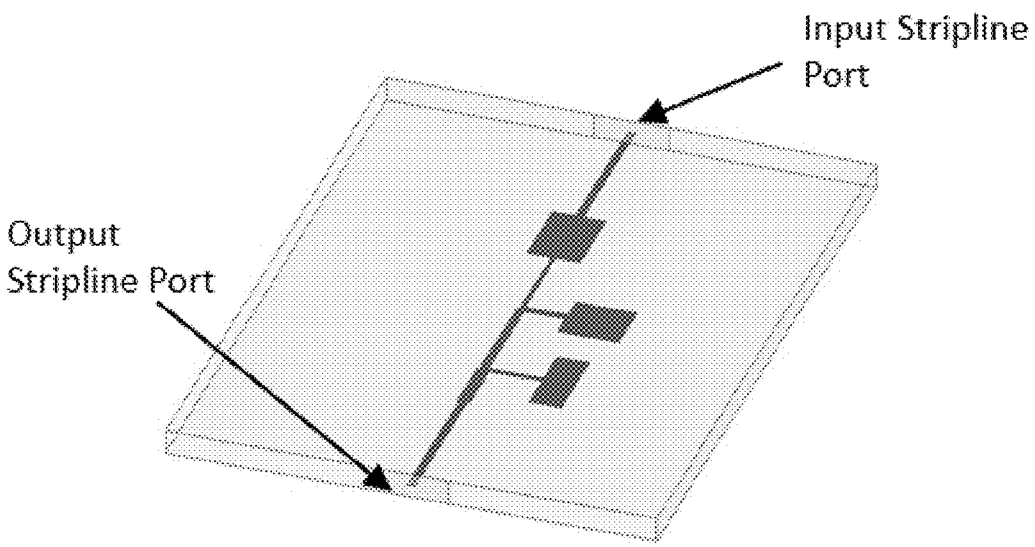
FIG. 12 shows a sixth order low pass elliptic filter.
Figure 13:
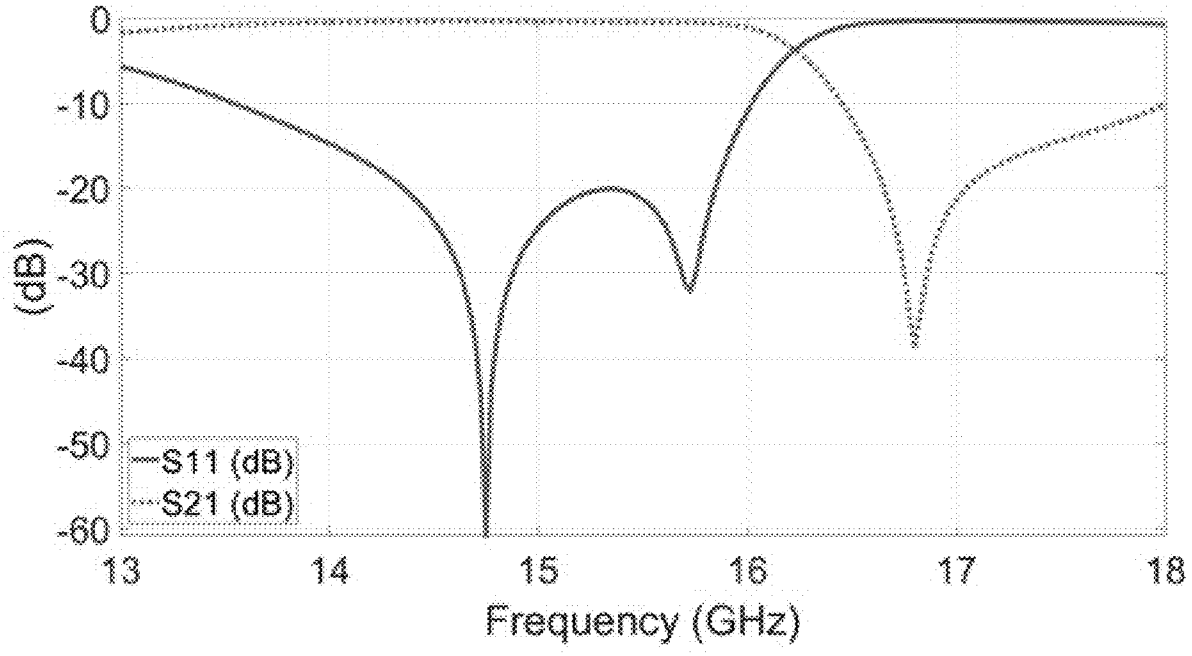
FIG. 13 shows a plot of the input port response (in dB) versus frequency (in GHz) for the filter of FIG. 12. The solid curve is for $S_{11}$ (in dB), and the dotted curve is for $S_{21}$ (in dB).
Figure 14:
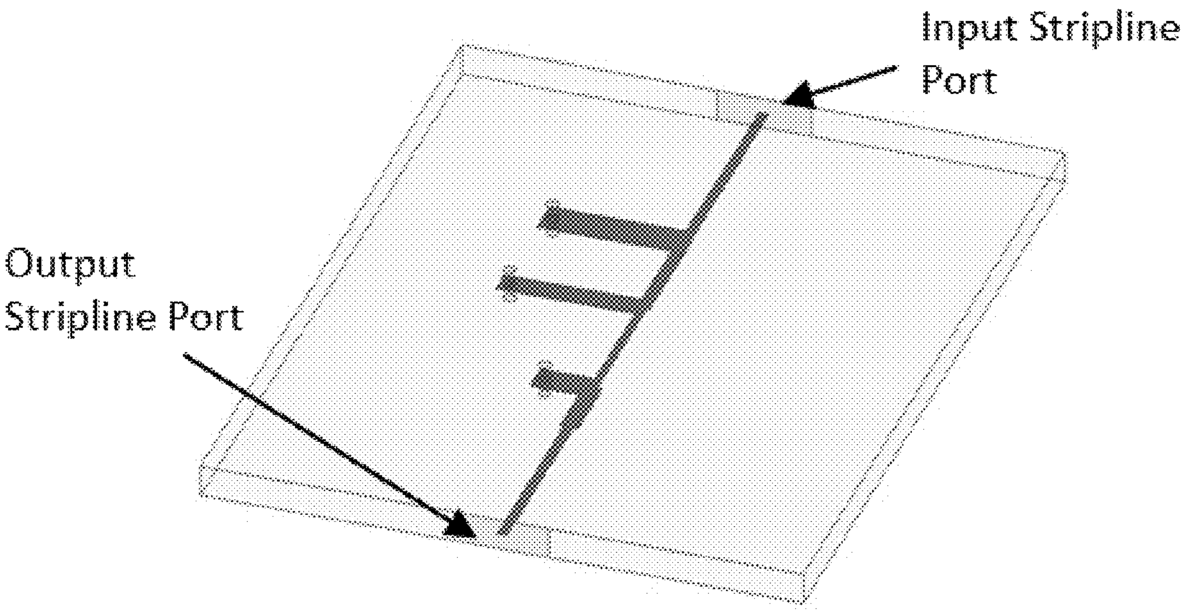
FIG. 14 shows a third order high pass filter.
Figure 15:
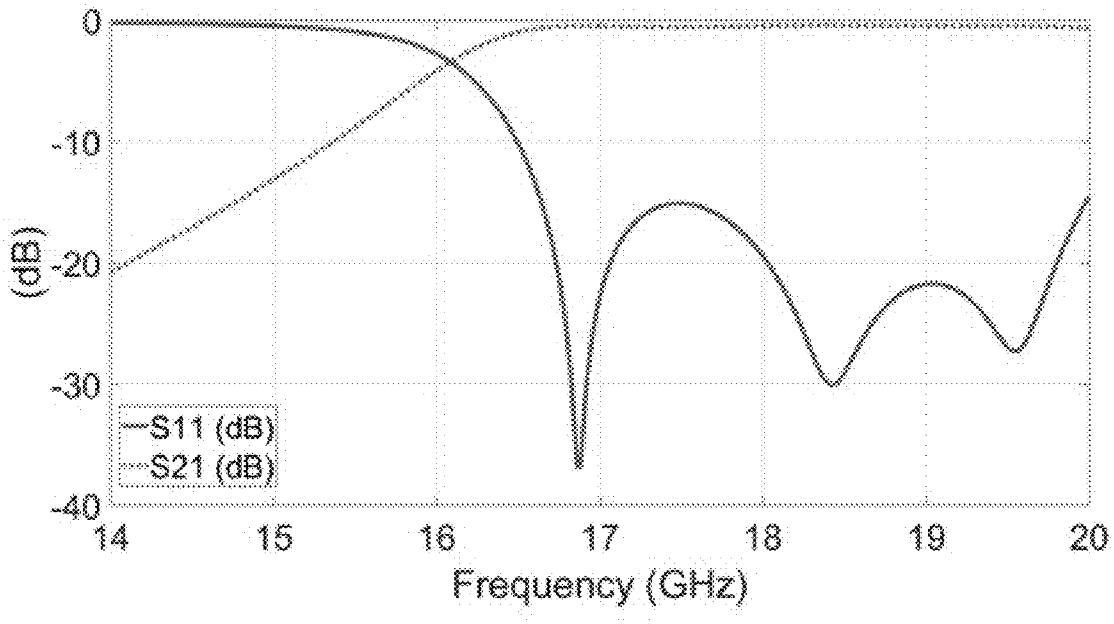
FIG. 15 shows a plot of the input port response (in dB) versus frequency (in GHz) for the filter of FIG. 14. The solid curve is for $S_{11}$ (in dB), and the dotted curve is for $S_{21}$ (in dB).

Each of FIG. 10 and FIG. 11 depicts a Rotman lens for a specific frequency, including a low-pass filter (FIG. 10) and a high-pass filter (FIG. 11) attached to the lens. This module can incorporate a stripline elliptic low-pass filter and/or a stripline third order high-pass filter at the respective Rotman lens inputs. In both instances, a third (or higher) order filter can be employed to achieve a sharp transition from passband to stop-band. This design enables Rotman-lens-based beamformers in two nearby (e.g., high band within 20% of low band) frequency bands to operate simultaneously. FIG. 12 shows a low-pass filter, and FIG. 14 shows a high-pass filter. FIGS. 13 and 15 show the input port's insertion and reflection performance versus frequency for the filters for FIG. 12 and FIG. 14, respectively.

Figure 22:
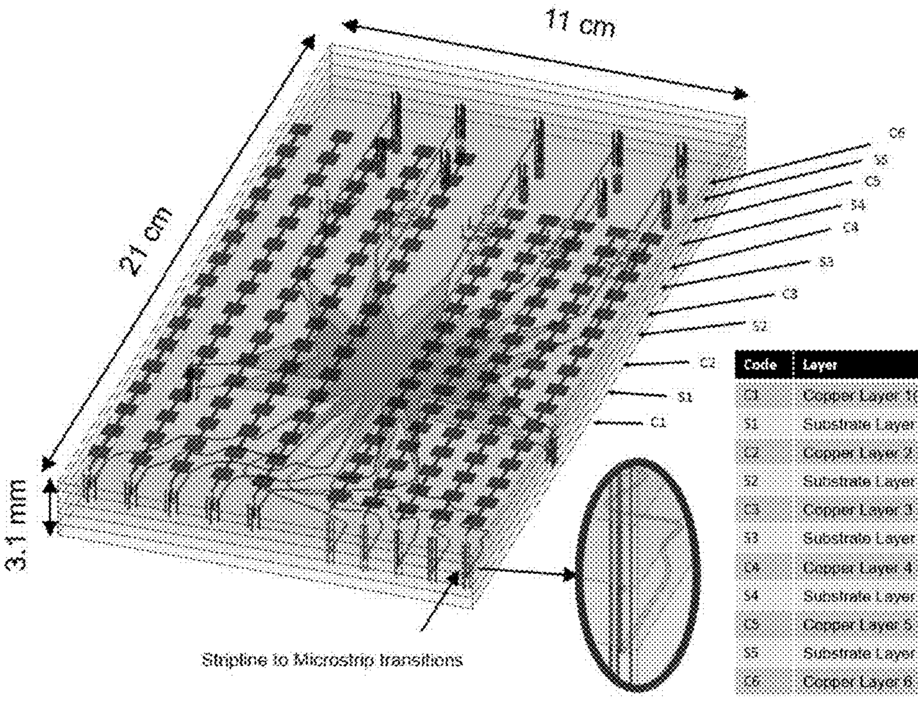
FIG. 22 shows a 3D view of a dual-band Rotman-lens-based beamforming module, according to an embodiment of the subject invention. Though FIG. 22 lists certain materials and dimensions, these are for demonstrative purposes only and should not be construed as limiting. Other materials or dimensions can be used.
Figure 23:
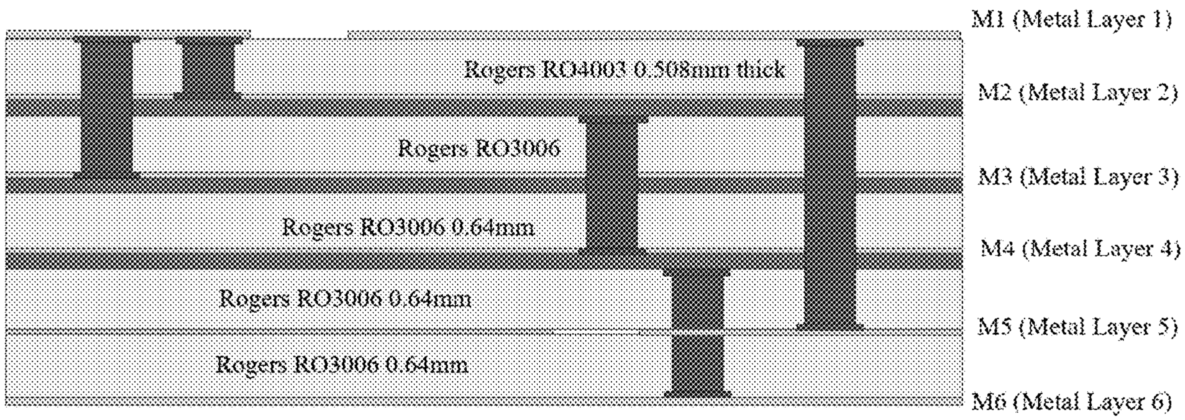
FIG. 23 shows a cross-sectional view of metallized layers and metal layers (e.g., copper layers) that can be used in a dual-band Rotman-lens-based beamforming module, according to an embodiment of the subject invention. Though FIG. 23 lists certain materials and dimensions, these are for demonstrative purposes only and should not be construed as limiting. Other materials or dimensions can be used.

FIG. 22 shows a 3D view of a dual-band Rotman-lens-based beamforming module, according to an embodiment of the subject invention, and FIG. 23 shows a cross-sectional view of metallized layers and metal layers (e.g., copper layers) that can be used in a dual-band Rotman-lens-based beamforming module, according to an embodiment of the subject invention. Though FIGS. 22 and 23 list certain materials and dimensions, these are for demonstrative purposes only and should not be construed as limiting. Other materials or dimensions can be used. Referring to FIGS. 22 and 23, metal layers can alternate with substrate layers (e.g., electrically insulating substrate layers). Metallized vias can connect metal layers with each other, such as metal layer 1 (the top metal layer, which can be referred to as M1) with metal layer 2 (the second-from-the-top metal layer, which can be referred to as M2 (and other metal layers are named correspondingly)), M1 to M3, M1 to M5, M2 to M4, and/or M4 to M6 (though other connections via metallized vias are possible). As indicated in FIG. 22, the metal layers M1, M2, M3, M4, M5, and M6 can respectively correspond to a first ground plane, a first Rotman lens, a second ground plane, a second Rotman lens, a third ground plane, and the antenna array layer.

The layers can include, for example, at least six metal layers and at least five substrate layers. An adhesive (e.g., Rogers 2929 bondply (15 micrometers (μm) to 30 μm) can be used to bond layers together. The finest trace line can have a width of, for example, no more than 0.5 millimeters (mm) (e.g., 0.21 mm or about 0.21 mm)). The finest via/through pin diameter can have be, for example, no more than 0.5 mm (e.g., 0.3 mm or about 0.3 mm). The module can have buried and/or blind vias.

Embodiments of the subject invention provide at least the following advantages: +45° dual band simultaneous beam scanning; a dual-band Rotman lens module without any air gap (thereby making the module about 20 times thinner compared to the case where air gap(s) are present); use of low-pass filters and high-pass filters with sharp transitions in Rotman lens inputs for simultaneous beamforming operation in two close frequency bands; and simplified vertical stripline-to-microstrip transition.

Embodiments of the subject invention provide simultaneous dual-band beamforming in two close frequency bands, reduced mutual coupling between two arrays in simultaneous dual-band operation, use of high-pass filters and low-pass filters in Rotman lens inputs, an increased number of input and output array ports for improved results (compared to related art designs), and a design in different frequencies.

The thin dual-band beamforming modules of embodiments of the subject invention have many applications, including but not limited to CubeSat and UAV technologies, which need lightweight high-gain low-scanning capacities from antenna array modules. CubeSats in need of high-data-rate transfer and communication with multiple ground stations at a time greatly require the types of modules provided by embodiments of the subject invention. Also, both defense and commercial UAVs need angle of arrival information from foreign objects or UAVs, and the modules of embodiments of the subject invention enable that capability.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

Figure 16:
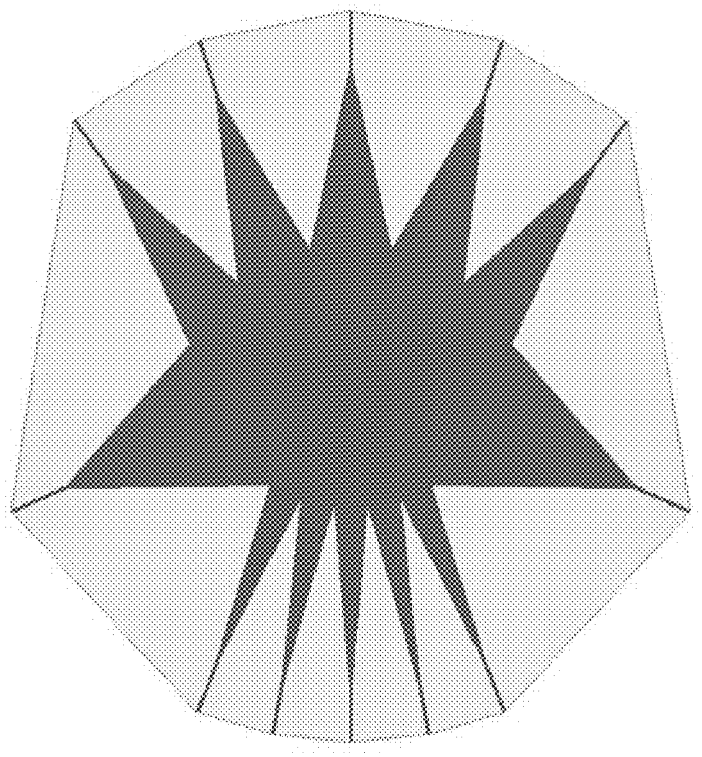
FIG. 16 shows input/beam ports and five array ports for a stripline Rotman lens.
Figure 17:
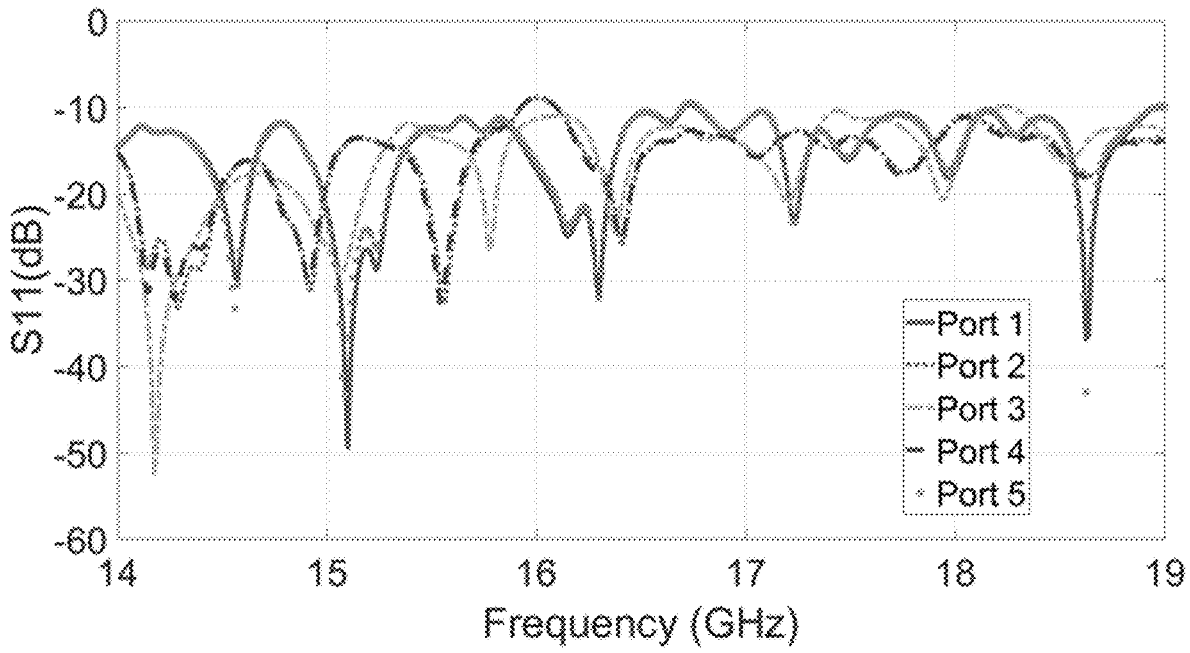
FIG. 17 shows a plot of $S_{11}$ (in dB) versus frequency (in GHz) for a standalone Rotman lens (e.g., as shown in FIG. 16). The solid curve with the lowest $S_{11}$ value at a frequency of 15.1 GHz is for port 1; the dashed curve with the lowest $S_{11}$ value at a frequency of 14.3 GHz is for port 2; the dashed curve with the lowest $S_{11}$ value at a frequency of 14.1 GHz is for port 3; the dashed curve that closely follows the curve for port 2 is for port 4; and the dotted curve with the lowest $S_{11}$ value at a frequency of 14.6 GHz is for port 5.
Figure 18:
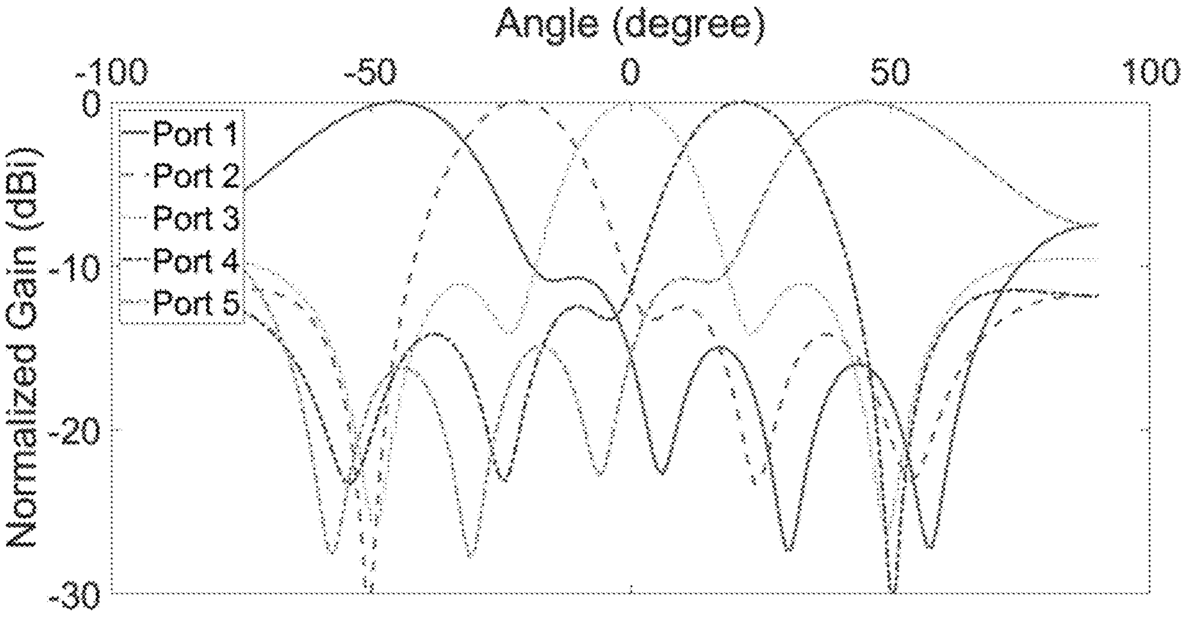
FIG. 18 shows a plot of normalized gain (in dB (isotropic) (dBi)) versus angle (in degrees) for standalone Rotman lens beamforming with 5 ports at 15.3 GHZ. The solid curve with the highest normalized gain value at an angle of −50 degrees is for port 1; the dashed curve with the highest normalized gain value at an angle of −25 degrees is for port 2; the dashed curve with the highest normalized gain value at an angle of 0 degrees is for port 3; the dashed curve with the highest normalized gain value at an angle of 20 degrees is for port 4; and the dashed curve with the highest normalized gain value at an angle of 45 degrees is for port 5.
Figure 19:
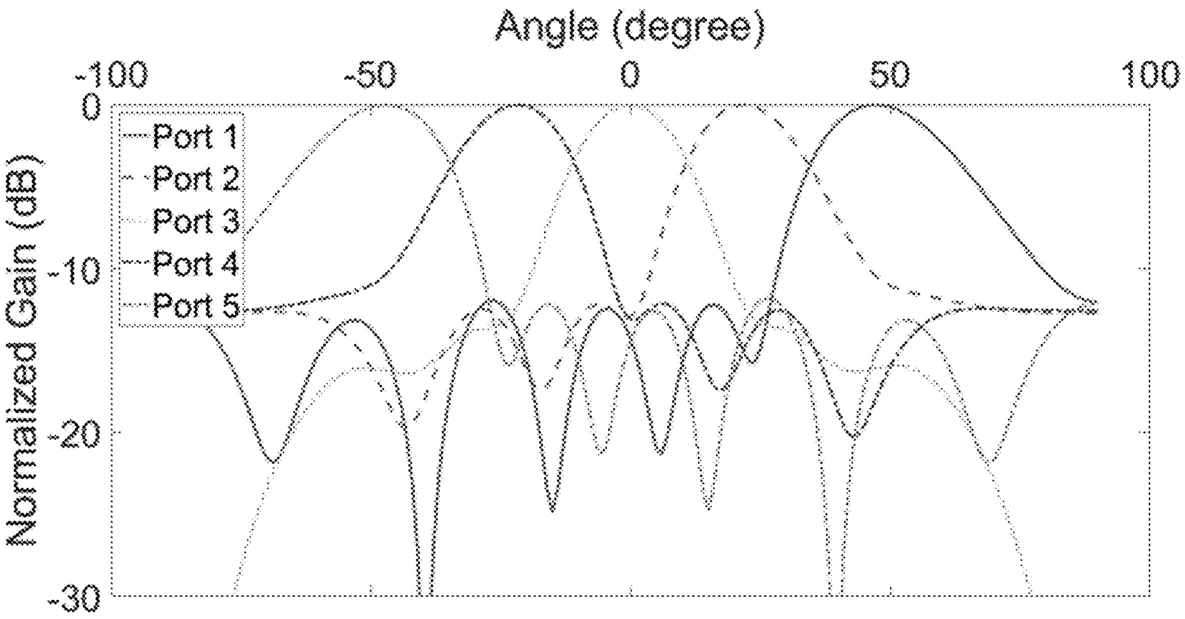
FIG. 19 shows a plot of normalized gain (in dBi) versus angle (in degrees) for standalone Rotman lens beamforming with 5 ports at 17.2 GHz. The solid curve with the highest normalized gain value at an angle of 45 degrees is for port 1; the dashed curve with the highest normalized gain value at an angle of 20 degrees is for port 2; the dashed curve with the highest normalized gain value at an angle of 0 degrees is for port 3; the dashed curve with the highest normalized gain value at an angle of −25 degrees is for port 4; and the dashed curve with the highest normalized gain value at an angle of −50 degrees is for port 5.
Figure 20:
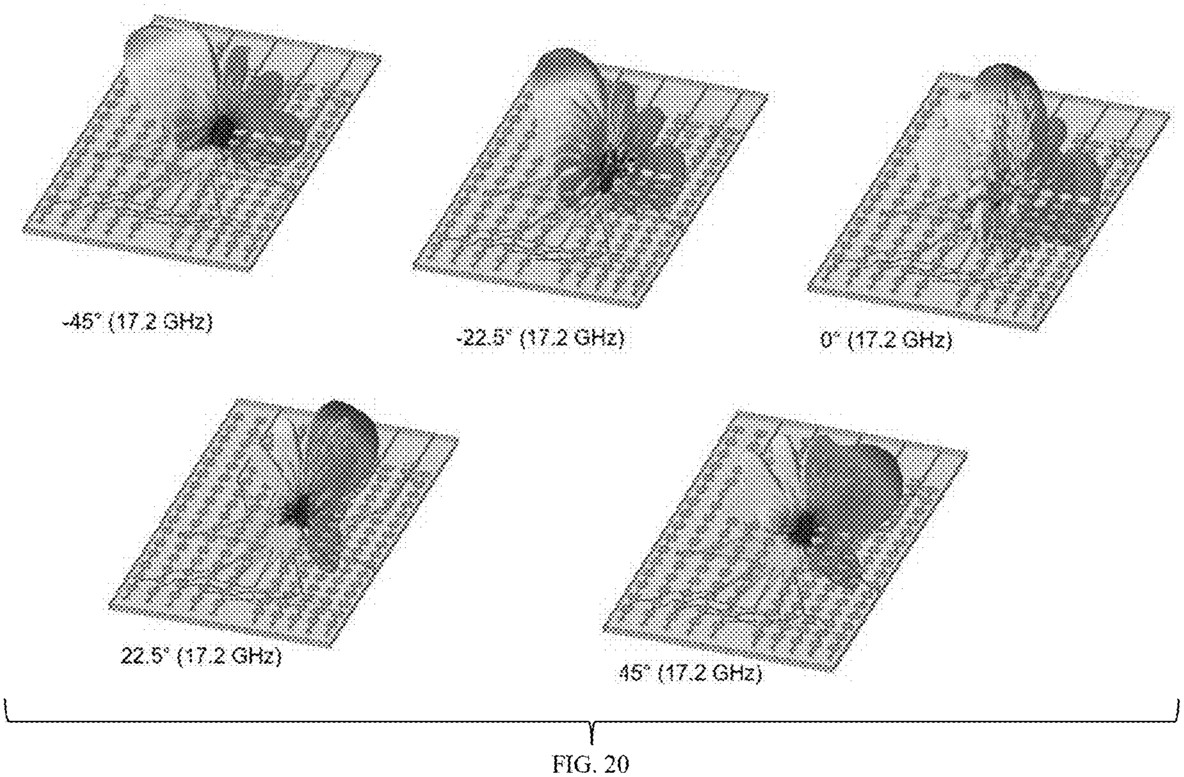
FIG. 20 shows beam scanning images at −45 degrees, −22.5 degrees, 0 degrees, 22.5 degrees, and 45 degrees for a Rotman lens module at 17.2 GHz.
Figure 21:
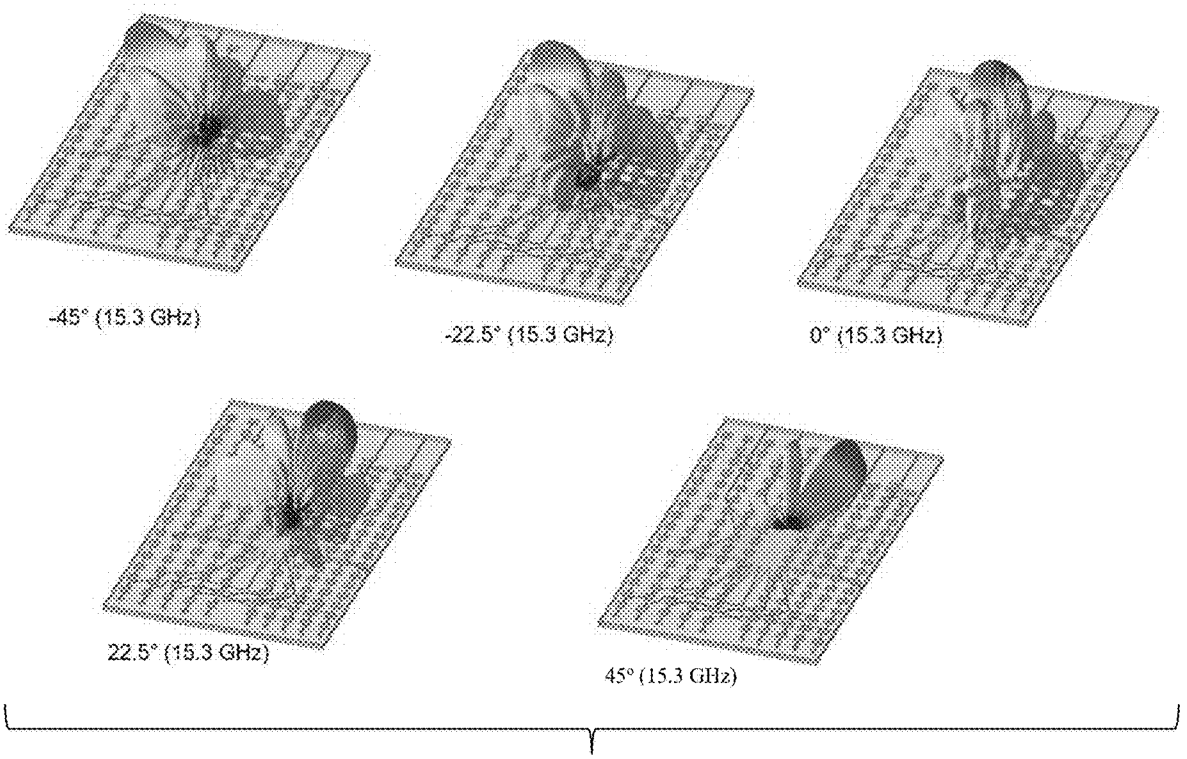
FIG. 21 shows beam scanning images at −45 degrees, −22.5 degrees, 0 degrees, 22.5 degrees, and 45 degrees for a Rotman lens module at 15.3 GHZ.

A standalone Rotman lens was designed, as shown in FIG. 16, and the geometry and design parameters followed the design equations and steps mentioned by Simon (Peter S. Simon, Analysis and Synthesis of Rotman Lenses, 22nd AIAA International Communications Satellite Systems Conference and Exhibit, 2004; which is hereby incorporated by reference herein in its entirety). The Rotman lens of an embodiment of the subject invention showed return losses better than 10 dB for all five beam ports within the frequency range of from 14 GHz to 19 GHz, covering both design frequencies of 15.3 GHZ and 17.2 GHz, as illustrated in FIG. 17. Remarkably, the main lobe to sidelobe levels for both frequencies were over 13 dB for ±45° scanning, as shown in FIG. 18 and FIG. 19. The lens generated five beams at −45°, −22.5°, 0°, 22.5°, and 45°. FIG. 20 and FIG. 21 present the 3D beamforming radiation patterns for the simultaneous operation of both frequencies across all available scan angles. FIG. 22 details all the geometrical dimensions, as well as the list of materials used and their properties, for this example. FIG. 23 shows the stacked arrangement of the metallized vias and metal (copper) layers, illustrating just one representative layer-to-layer transition for all identical transitions within those layers.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A device for simultaneous beamforming at two different frequency bands, the device comprising:

a first Rotman lens;

a second Rotman lens disposed on the first Rotman lens; and a top microstrip layer disposed on the second Rotman lens and comprising a first microstrip antenna patch array on a first area of the top microstrip layer and a second microstrip antenna patch array on a second area of the top microstrip layer different from the first area, the first microstrip antenna patch array being configured to operate at a first frequency, the second microstrip antenna patch array being configured to operate at a second frequency higher than the first frequency, the second frequency being no more than 20% higher than the first frequency.

2. The device according to claim 1, the first Rotman lens comprising a first filter connected to at least one input port of the first Rotman lens, the second Rotman lens comprising a second filter connected to at least one input port of the second Rotman lens, one of the first filter and the second filter being a low-pass filter and being electrically connected to the first microstrip antenna patch array, and the other of the first filter and the second filter being a high-pass filter and being electrically connected to the second microstrip antenna patch array.

3. The device according to claim 2, the first Rotman lens comprising a plurality of the first filters respectively connected to each input port of the first Rotman lens, and the second Rotman lens comprising a plurality of the second filters respectively connected to each input port of the second Rotman lens.

4. The device according to claim 3, the first Rotman lens comprising at least five input ports, and the second Rotman lens comprising at least five input ports.

5. The device according to claim 1, further comprising a first ground plane configured to function as a common ground plane for both the first Rotman lens and the second Rotman lens.

6. The device according to claim 1, further comprising a first substrate on which the first Rotman lens is disposed and a second substrate disposed on the first Rotman lens, and the first substrate and the second substrate each being electrically insulating.

7. The device according to claim 6, further comprising a third substrate on which the second Rotman lens is disposed and a fourth substrate disposed on the second Rotman lens, and the third substrate and the fourth substrate each being electrically insulating.

8. The device according to claim 1, the second Rotman lens being electrically connected to both the first Rotman lens and the top microstrip layer.

9. The device according to claim 1, comprising a layered structure comprising:

a first ground plane;

a first substrate disposed on the first ground plane;

the first Rotman lens disposed on the first substrate;

a second substrate disposed on the first Rotman lens;

a second ground plane disposed on the second substrate;

a third substrate disposed on the second ground plane;

the second Rotman lens disposed on the third substrate;

a fourth substrate disposed on the second Rotman lens;

a third ground plane disposed on the fourth substrate;

a fifth substrate disposed on the third ground plane; and the top microstrip layer disposed on the fifth substrate, the first substrate, the second substrate, the third substrate, the fourth substrate, and the fifth substrate each being electrically insulating.

10. The device according to claim 9, further comprising:

a first metallized via connected to the top microstrip layer and the second Rotman lens; and a second metallized via connected to the third ground plane and the first ground plane.

11. The device according to claim 10, further comprising:

a third metallized via connected to the second ground plane and the first ground plane.

12. The device according to claim 11, the layered structure comprising no air gaps between the first ground plane and the top microstrip layer.

13. The device according to claim 9, the layered structure comprising no air gaps between the first ground plane and the top microstrip layer.

14. The device according to claim 1, one of the first Rotman lens and the second Rotman lens being configured to operate at the first frequency and the other of the first Rotman lens and the second Rotman lens being configured to operate at the second frequency.

15. The device according to claim 1, the second frequency being no more than 15% higher than the first frequency.

16. The device according to claim 1, the first frequency being about 15.3 gigahertz (GHz), and the second frequency being about 17.2 GHz.

17. The device according to claim 1, the first Rotman lens, the second Rotman lens, the first microstrip antenna patch array, and the second microstrip antenna patch array all comprising the same metal.

18. A device for simultaneous beamforming at two different frequency bands, the device comprising:

a first Rotman lens;

a second Rotman lens disposed on the first Rotman lens; and a top microstrip layer disposed on the second Rotman lens and comprising a first microstrip antenna patch array on a first area of the top microstrip layer and a second microstrip antenna patch array on a second area of the top microstrip layer different from the first area, the first microstrip antenna patch array being configured to operate at a first frequency, the second microstrip antenna patch array being configured to operate at a second frequency higher than the first frequency, the second frequency being no more than 15% higher than the first frequency, the first Rotman lens comprising at least five input ports, the second Rotman lens comprising at least five input ports, the first Rotman lens comprising a plurality of first filters respectively connected to each input port of the first Rotman lens, the second Rotman lens comprising a plurality of second filters respectively connected to each input port of the second Rotman lens, either: a) each first filter of the plurality of first filters being a low-pass filter and being electrically connected to the first microstrip antenna patch array, and each second filter of the plurality of second filters being a high-pass filter and being electrically connected to the second microstrip antenna patch array; or b) each first filter of the plurality of first filters being a high-pass filter being electrically connected to the second microstrip antenna patch array, and each second filter of the plurality of second filters being a low-pass filter and being electrically connected to the first microstrip antenna patch array, the device comprising a layered structure comprising:

a first ground plane;

a first substrate disposed on the first ground plane;

the first Rotman lens disposed on the first substrate;

a second substrate disposed on the first Rotman lens;

a second ground plane disposed on the second substrate;

a third substrate disposed on the second ground plane;

the second Rotman lens disposed on the third substrate;

a fourth substrate disposed on the second Rotman lens;

a third ground plane disposed on the fourth substrate;

a fifth substrate disposed on the third ground plane;

the top microstrip layer disposed on the fifth substrate;

a first metallized via connected to the top microstrip layer and the second Rotman lens; and a second metallized via connected to the third ground plane and the first ground plane, the first substrate, the second substrate, the third substrate, the fourth substrate, and the fifth substrate each being electrically insulating, the layered structure comprising no air gaps between the first ground plane and the top microstrip layer, and one of the first Rotman lens and the second Rotman lens being configured to operate at the first frequency and the other of the first Rotman lens and the second Rotman lens being configured to operate at the second frequency.

19. The device according to claim 18, further comprising:

a third metallized via connected to the second ground plane and the first ground plane.

20. The device according to claim 18, the first frequency being about 15.3 gigahertz (GHz), and the second frequency being about 17.2 GHz.

* * * * *